United States Patent
Williams

(10) Patent No.: US 8,823,342 B2
(45) Date of Patent: Sep. 2, 2014

(54) MULTIPLE-OUTPUT DUAL-POLARITY DC/DC CONVERTERS AND VOLTAGE REGULATORS

(75) Inventor: Richard Williams, Cupertino, CA (US)

(73) Assignee: Advanced Analogic Technologies Incorporated, Santa Clara, CA (US)

( * ) Notice: Subject to any disclaimer, the term of this patent is extended or adjusted under 35 U.S.C. 154(b) by 1132 days.

(21) Appl. No.: 12/168,626

(22) Filed: Jul. 7, 2008

(65) Prior Publication Data

US 2010/0002473 A1   Jan. 7, 2010

(51) Int. Cl.
 *G05F 1/00* (2006.01)
(52) U.S. Cl.
 USPC .......................................................... 323/268
(58) Field of Classification Search
 USPC .................. 307/11, 29, 35, 39; 323/234, 237, 323/267–272, 265, 273, 282; 363/65
 See application file for complete search history.

(56) References Cited

U.S. PATENT DOCUMENTS

| | | | | |
|---|---|---|---|---|
| 7,256,568 B2* | 8/2007 | Lam et al. | | 323/222 |
| 7,372,239 B2* | 5/2008 | Kumagai et al. | | 323/267 |
| 2002/0113581 A1* | 8/2002 | Eagar et al. | | 323/282 |
| 2006/0284490 A1* | 12/2006 | Kumar | | 307/82 |
| 2008/0246408 A1* | 10/2008 | Yee | | 315/185 R |

* cited by examiner

*Primary Examiner* — Adolf Berhane
*Assistant Examiner* — Jeffrey Gblende
(74) *Attorney, Agent, or Firm* — Lando & Anastasi, LLP

(57) ABSTRACT

A multi-output dual polarity inductive boost converter includes an inductor, a first output node, a second output node, and a switching network, the switching network configured to provide the following modes of circuit operation: a first mode where the positive electrode of the inductor is connected to an input voltage and the negative electrode of the inductor is connected to ground; 2) a second mode the negative electrode of the inductor is connected to ground and the positive electrode of the inductor is connected in sequence to one or more of the fourth and fifth output nodes; and 3) a third mode where the positive electrode of the inductor is connected to the input voltage and the negative electrode of the inductor is connected in sequence to one or more of the first, second and third output nodes.

26 Claims, 12 Drawing Sheets

Fig. 6
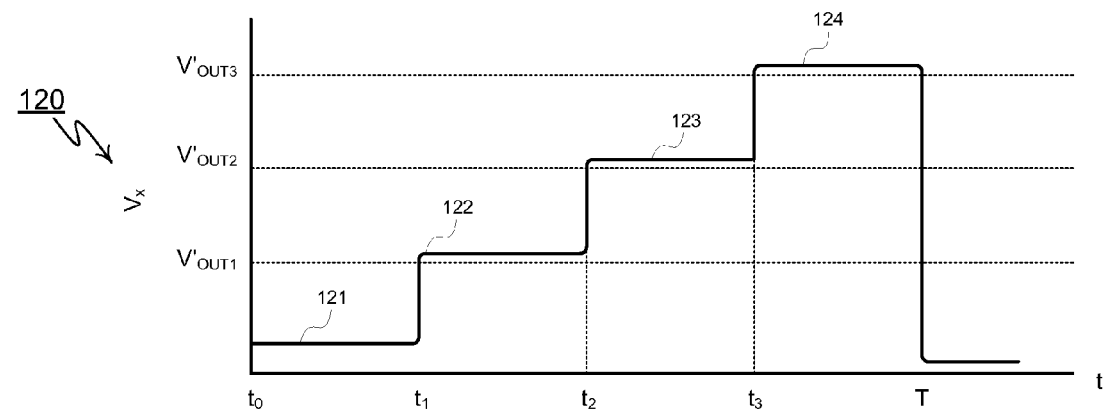
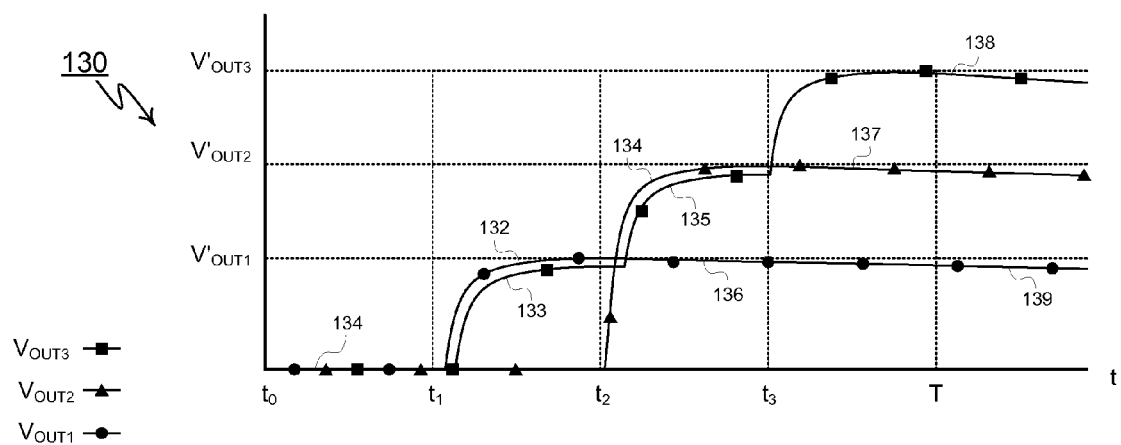
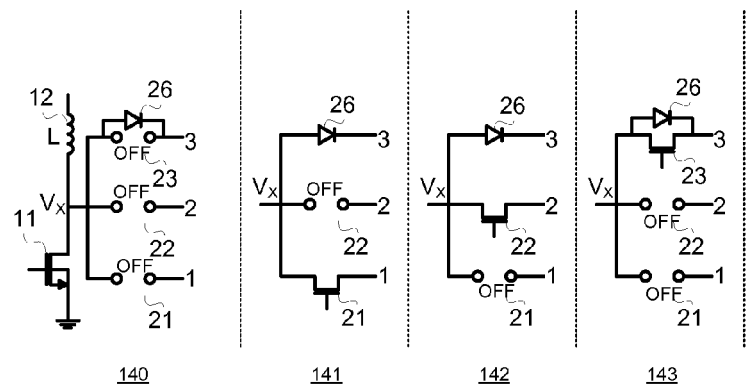

MULTIPLE-OUTPUT DUAL-POLARITY DC/DC CONVERTERS AND VOLTAGE REGULATORS

BACKGROUND OF THE INVENTION

Voltage regulation is commonly required to prevent variation in the supply voltage powering various microelectronic components such as digital ICs, semiconductor memory, display modules, hard disk drives, RF circuitry, microprocessors, digital signal processors and analog ICs, especially in battery powered application likes cell phones, notebook computers and consumer products.

Since the battery or DC input voltage of a product often must be stepped-up to a higher DC voltage, or stepped-down to a lower DC voltage, such regulators are referred to as DC-to-DC converters. Step-down converters are used whenever a battery's voltage is greater than the desired load voltage. Step-down converters may comprise inductive switching regulators, capacitive charge pumps, and linear regulators. Conversely, step-up converters, commonly referred to boost converters, are needed whenever a battery's voltage is lower than the voltage needed to power its load. Step-up converters may comprise inductive switching regulators or capacitive charge pumps.

Of the aforementioned voltage regulators, the inductive switching converter can achieve superior performance over the widest range of currents, input voltages and output voltages. The fundamental principal of a DC/DC inductive switching converter is based on the simple premise that the current in an inductor (coil or transformer) cannot be changed instantly and that an inductor will produce an opposing voltage to resist any change in its current.

The basic principle of an inductor-based DC/DC switching converter is to switch or "chop" a DC supply into pulses or bursts, and to filter those bursts using a low-pass filter comprising and inductor and capacitor to produce a well behaved time varying voltage, i.e. to change DC into AC. By using one or more transistors switching at a high frequency to repeatedly magnetize and de-magnetize an inductor, the inductor can be used to step-up or step-down the converter's input, producing an output voltage different from its input. After changing the AC voltage up or down using magnetics, the output is then rectified back into DC, and filtered to remove any ripple.

The transistors are typically implemented using MOSFETs with a low on-state resistance, commonly referred to as "power MOSFETs". Using feedback from the converter's output voltage to control the switching conditions, a constant well-regulated output voltage can be maintained despite rapid changes in the converter's input voltage or its output current.

To remove any AC noise or ripple generated by switching action of the transistors, an output capacitor is placed across the output of the switching regulator circuit. Together the inductor and the output capacitor form a "low-pass" filter able to remove the majority of the transistors' switching noise from reaching the load. The switching frequency, typically 1 MHz or more, must be "high" relative to the resonant frequency of the filter's "LC" tank. Averaged across multiple switching cycles, the switched inductor behaves like a programmable current source with a slow-changing average current.

Since the average inductor current is controlled by transistors that are either biased as "on" or "off" switches, then power dissipation in the transistors is theoretically small and high converter efficiencies, in the eighty to ninety percent range, can be realized. Specifically when a power MOSFET is biased as an on-state switch using a "high" gate bias, it exhibits a linear I-V drain characteristic with a low $R_{DS}(on)$ resistance typically 200 milliohms or less. At 0.5 A for example, such a device will exhibit a maximum voltage drop $I_D \cdot R_{DS}(on)$ of only 100 mV despite its high drain current. Its power dissipation during its on-state conduction time is $I_D^2 \cdot R_{DS}(on)$. In the example given the power dissipation during the transistor's conduction is $(0.5 A)^2 \cdot (0.2\Omega) = 50$ mW.

In its off state, a power MOSFET has its gate biased to its source, i.e. so that $V_{GS}=0$. Even with an applied drain voltage $V_{DS}$ equal to a converter's battery input voltage $V_{batt}$, a power MOSFET's drain current $I_{DSS}$ is very small, typically well below one microampere and more generally nanoamperes. The current $I_{DSS}$ primarily comprises junction leakage.

So a power MOSFET used as a switch in a DC/DC converter is efficient since in its off condition it exhibits low currents at high voltages, and in its on state it exhibits high currents at a low voltage drop. Excepting switching transients, the $I_D \cdot V_{DS}$ product in the power MOSFET remains small, and power dissipation in the switch remains low.

Power MOSFETs are not only used to convert AC into DC by chopping the input supply, but may also be used to replace the rectifier diodes needed to rectify the synthesized AC back into DC. Operation of a MOSFET as a rectifier often is accomplished by placing the MOSFET in parallel with a Schottky diode and turning on the MOSFET whenever the diode conducts, i.e. synchronous to the diode's conduction. In such an application, the MOSFET is therefore referred to as a synchronous rectifier.

Since the synchronous rectifier MOSFET can be sized to have a low on-resistance and a lower voltage drop than the Schottky, conduction current is diverted from the diode to the MOSFET channel and overall power dissipation in the "rectifier" is reduced. Most power MOSFETs includes a parasitic source-to-drain diode. In a switching regulator, the orientation of this intrinsic P-N diode must be the same polarity as the Schottky diode, i.e. cathode to cathode, anode to anode. Since the parallel combination of this silicon P-N diode and the Schottky diode only carry current for brief intervals known as "break-before-make" before the synchronous rectifier MOSFET turns on, the average power dissipation in the diodes is low and the Schottky oftentimes is eliminated altogether.

Assuming transistor switching events are relatively fast compared to the oscillating period, the power loss during switching can in circuit analysis be considered negligible or alternatively treated as a fixed power loss. Overall, then, the power lost in a low-voltage switching regulator can be estimated by considering the conduction and gate drive losses. At multi-megahertz switching frequencies, however, the switching waveform analysis becomes more significant and must be considered by analyzing a device's drain voltage, drain current, and gate bias voltage drive versus time.

Based on the above principles, present day inductor-based DC/DC switching regulators are implemented using a wide range of circuits, inductors, and converter topologies. Broadly they are divided into two major types of topologies, non-isolated and isolated converters.

The most common isolated converters include the flyback and the forward converter, and require a transformer or coupled inductor. At higher power, full bridge converters are also used. Isolated converters are able to step up or step down their input voltage by adjusting the primary to secondary winding ratio of the transformer. Transformers with multiple windings can produce multiple outputs simultaneously, including voltages both higher and lower than the input. The disadvantage of transformers is they are large compared to single-winding inductors and suffer from unwanted stray inductances.

Non-isolated power supplies include the step-down Buck converter, the step-up boost converter, and the Buck-boost converter. Buck and boost converters are especially efficient and compact in size, especially operating in the megahertz frequency range where inductors 2.2 µH or less may be used. Such topologies produce a single regulated output voltage per coil, and require a dedicated control loop and separate PWM controller for each output to constantly adjust switch on-times to regulate voltage.

In portable and battery powered applications, synchronous rectification is commonly employed to improve efficiency. A step-down Buck converter employing synchronous rectification is known as a synchronous Buck regulator. A step-up boost converter employing synchronous rectification is known as a synchronous boost converter.

Synchronous Boost Converter Operation: As illustrated in FIG. 1, prior art synchronous boost converter 1 includes a low-side power MOSFET switch 11, battery connected inductor 5, an output capacitor 8, and "floating" synchronous rectifier MOSFET 7 with parallel rectifier diode 6. The gates of the MOSFETs driven by break-before-make circuitry 3 and controlled by PWM controller 2 in response to voltage feedback $V_{FB}$ from the converter's output present across filter capacitor 8. Break-before-make, i.e. BBM, operation is needed to prevent shorting out output capacitor 8.

The synchronous rectifier MOSFET 7, which may be N-channel or P-channel, is considered floating in the sense that its source and drain terminals are not permanently connected to any supply rail, i.e. neither to ground or $V_{batt}$. Diode 6 is a P-N diode intrinsic to synchronous rectifier MOSFET 7, regardless whether synchronous rectifier is a P-channel or an N-channel device. A Schottky diode may be included in parallel with MOSFET 7 but with series inductance may not operate fast enough to divert current from forward biasing intrinsic diode 6. Diode 9 comprises a P-N junction diode intrinsic to N-channel low-side MOSFET 4 and remains reverse biased under normal boost converter operation. Since diode 7 does not conduct under normal boost operation, it is shown as dotted lines.

If we define the converter's duty factor D as the time that energy flows from the battery or power source into the DC/DC converter, i.e. during the time that low-side MOSFET switch 4 is on and inductor 3 is being magnetized, then the output to input voltage ratio of a boost converter is proportionate to the inverse of 1 minus its duty factor, i.e.

$$\frac{V_{out}}{V_{in}} = \frac{1}{1-D} \equiv \frac{1}{1-t_{sw}/T}$$

While this equation describes a wide range of conversion ratios, the boost converter cannot smoothly approach a unity transfer characteristic without requiring extremely fast devices and circuit response times. For high duty factors and conversion ratios, the inductor conducts large spikes of current and degrades efficiency. Considering these factors, boost converter duty factors are practically limited to the range of 5% to 75%.

The Need for Dual Polarity Regulated Voltages: Today's electronic devices require a large number of regulated voltages to operate, some of which may be negative with respect to ground. Some smart phones may use more than twenty-five separate regulated supplies in a single handheld, including negative bias supply needed for some organic light emitting diodes (OLEDs), displays, for biasing LCD's, and for a variety of other applications. Space limitations preclude the use of so many switching regulators each with separate inductors.

Unfortunately, multiple output non-isolated converters capable of generating both positive and negative supply voltage require multiple winding or tapped inductors. While smaller than isolated converters and transformers, tapped inductors are also substantially larger and taller in height than single winding inductors, and suffer from increased parasitic effects and radiated noise. As a result multiple winding inductors are typically not employed in any space sensitive or portable device such as handsets and portable consumer electronics.

As a compromise, today's portable devices employ only a few switching regulators in combination with a number of linear regulators to produce the requisite number of independent supply voltages. While the efficiency of the low-drop-out linear regulators, or LDOs, is often worse than the switching regulators, they are much smaller and lower in cost since no coil is required. As a result efficiency and battery life is sacrificed for lower cost and smaller size. Negative supply voltages require a dedicated switching regulator that cannot be shared with positive voltage regulators. More than one negative regulated supply voltage may be required.

What is needed is a switching regulator implementation capable of producing both multiple positive and negative outputs, i.e. multiple dual polarity outputs, from a single winding inductor, minimizing both cost and size.

SUMMARY OF THE INVENTION

This disclosure describes an inventive boost converter able to produce multiple independently-regulated outputs of opposite polarity, i.e. one or more positive above-ground output and one or more negative below-ground output from one single-winding inductor. A representative implementation of the dual polarity inductive boost converter includes an inductor and a switching network, the switching network configured to provide the following modes of circuit operation: 1) a first mode where the positive electrode of the inductor is connected to an input voltage and the negative electrode of the inductor is connected to ground; 2) a second mode where the negative electrode of the inductor in sequence to one or more of a first, second and third output nodes and the positive electrode of the inductor is connected in sequence to one or more of a fourth and fifth output nodes; and 3) a third mode where the positive electrode of the inductor is connected to the input voltage and the negative electrode of the inductor is connected to the either the third, fourth, or fifth output node output node. For clarification, it should be noted that said positive electrode so named because it has a higher positive potential during charging in the first mode of operation actually exhibits a negative potential during the second mode of operation. Said negative terminal of the inductor, while having a potential during magnetizing more negative than the positive terminal of the inductor, during the second and third modes of operation exhibits a more positive voltage than the inductor's other terminal.

The first mode of operation charges, i.e. magnetizes, the inductor to a voltage roughly equal to the input voltage. The second mode of operation transfers charge to the first or second output nodes while simultaneously transferring charge to the third, fourth, or fifth output nodes.

During the second mode of operation, in one embodiment of the invention after charge is transferred to the first output node, charge transfer from the inductor is diverted to the second output node while the circuit remains in its second mode of operation. During charge transfer of the second operating mode, first and second output nodes become biased to negative voltages i.e. below ground, potentials. In tandem to the sequential charging of the first and second output nodes, charge is also transferred to a third output node, followed sequentially by the charging of a fourth and optionally by a fifth output node. During charge transfer of the second operating mode, third, fourth and optionally fifth output nodes become biased to positive boosted voltages i.e. above the converter's input voltage.

Once the second or the fifth output node reaches its target voltage, the converter's second operating mode ends. Assuming the second output node reaches its target voltage the third mode of operation continues charging the third, fourth and fifth output nodes in sequence until the fifth reaches its target voltage. In this way, the boost converter provides five regulated outputs from a single inductor, the charging time of each output node used to determine the value of the output.

It will be obvious to anyone skilled in the art that this technique can be scaled to a fewer or greater number of positive and negative output channels.

For a second embodiment, the same basic components are used. In this case, however, the switching network provides the following modes of operation: 1) a first mode where the positive electrode of the inductor is connected to an input voltage and the negative electrode of the inductor is connected to ground; 2) a second mode where the positive electrode of the inductor is connected to the input voltage and the negative electrode of the inductor is connected to either a third, fourth or fifth output node; and 3) a third mode where the positive electrode of the inductor is connected to the first or second output node and the negative electrode of the inductor is connected to ground.

The first mode of operation charges the inductor to a voltage equal to the input voltage. The second mode of operation transfers charge sequentially to the third, fourth and fifth output nodes and ends when the fifth output node reaches a target voltage. The third mode of operation transfers charge sequentially to the first and second output nodes; and ends when second output node reaches its target voltage. In this way, the boost converter provides five regulated outputs from a single inductor.

In a third embodiment, the converter alternates between operation in accordance with the first and second embodiments depending on which output voltage requires a longer duration to reach or maintain a targeted output voltage.

In the first three embodiments, both positive and negative outputs are charged in tandem until one of the two outputs reaches the third state. In an alternative implementation, the two outputs are charged not simultaneously but in alternating sequence.

In an alternative embodiment the sequence and on time of charging the positive and negative outputs varies algorithmically in response to the output voltages staying within a predetermined tolerance range of the targeted output voltages.

In another embodiment the sequencing of the power MOSFETs is controlled algorithmically by a microprocessor or other programmable logic in response to feedback from one or more analog-to-digital converters monitoring the output voltages.

In one embodiment the power MOSFETs connecting the inductor to the positive outputs utilize either P-channel or N-channel MOSFETs with circuitry to prevent forward biasing of any diode between the MOSFETs source and drain terminals. In a preferred embodiment the MOSFET connected to the highest positive output voltage includes a source-body short and an intrinsic diode parallel to its source and drain terminals.

In another embodiment, the power MOSFETs connecting the inductor to the positive outputs utilize P-channel MOSFETs with the body connection tied to a fixed positive potential, preferably the most positive output voltage.

In one embodiment the power MOSFETs connecting the inductor to the negative outputs utilize either P-channel or N-channel MOSFETs with circuitry to prevent forward biasing of any diode between the MOSFETs source and drain terminals. In a preferred embodiment the MOSFET connected to the most negative output voltage includes a source-body short and an intrinsic diode parallel to its source and drain terminals.

In another embodiment, the power MOSFETs connecting the inductor to the negative outputs utilize isolated N-channel MOSFETs with the body connection tied to a fixed positive potential, preferably the most negative output voltage and with an isolation region connected to the most positive output voltage or alternatively, the converter's input

BRIEF DESCRIPTION OF THE DRAWINGS

FIG. 6 illustrates the switching waveform of the boost converter of FIG. 2 showing time multiplexed charging on the positive output nodes and their related equivalent circuits.

DETAILED DESCRIPTION OF THE PREFERRED EMBODIMENTS

As described previously, conventional non-isolated switching regulators require one single-winding inductor and corresponding dedicated PWM controller for each regulated output voltage and polarity. In contrast, this disclosure describes an inventive boost converter able to produce multiple independently-regulated outputs of opposite polarity, i.e. one or more positive above-ground outputs and one or more negative below-ground output from one single-winding inductor.

Figure 2:
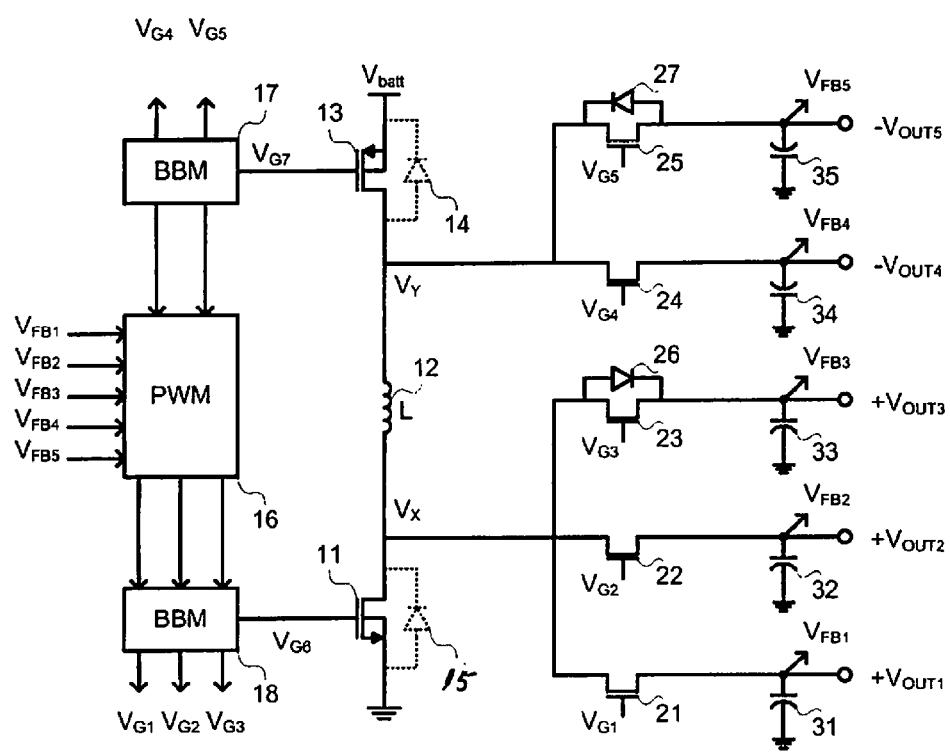
FIG. 2 is a schematic of a dual-polarity five-output synchronous boost converter as provided by the present invention.

Shown in FIG. 2, a five-output dual polarity inductive boost converter 10 comprises low-side N-channel MOSFET 11, inductor 12, high-side P-channel MOSFET 13, floating positive-output synchronous rectifier 23 with intrinsic source-to-drain diode 26, floating positive-output synchronous rectifiers 22 and 21 with no parallel source-drain diodes, floating negative-output synchronous rectifier 25 with intrinsic source-to-drain diode 27, floating negative-output synchronous rectifier 24 with no parallel source-drain diode, output filter capacitors 31, 32, 33, 34 and 35 filtering outputs $+V_{OUT1}$, $+V_{OUT2}$, $+V_{OUT3}$, $-V_{OUT4}$, and $-V_{OUT5}$. Regulator operation is controlled by PWM-controller 16 including break-before-make gate buffers 17 and 18, which control the on-time of MOSFETs 11, 13, 21, 22, 23, 24 and 25. PWM controller 16 may operate at fixed or variable frequency.

Closed-loop regulation is achieved through independent feedback from the outputs $+V_{OUT1}$, $+V_{OUT2}$, $+V_{OUT3}$, $-V_{OUT4}$, and $-V_{OUT5}$ using corresponding feedback signals $V_{FB1}$, $V_{FB2}$, $V_{FB3}$, $V_{FB4}$, and $V_{FB5}$. The feedback voltages may be scaled by resistor dividers (not shown) or other level shift circuitry as needed. Low-side MOSFET 11 includes intrinsic P-N diode 15 shown by dotted lines, which under normal operation remains reverse biased and non-conducting. Similarly, high-side MOSFET 13 includes intrinsic P-N diode 14 shown by dotted lines, which under normal operation remains reverse biased and non-conducting. High-side MOSFET 13 may be implemented using either P-channel or N-channel MOSFETs with appropriate adjustments in gate drive circuitry.

Unlike in conventional boost converters, in dual-polarity boost converter 10 magnetizing the inductor requires turning on both a high-side MOSFET 13 and a low-side MOSFET 11. Inductor 12 is therefore not hard-wired to either $V_{batt}$ or to ground. As a result the inductor's terminal voltages at nodes $V_x$ and $V_y$ are not permanently fixed or limited to any given voltage potential except by forward biasing of intrinsic P-N diodes 14 and 15 and by the avalanche breakdown voltages of the devices employed.

Specifically, node $V_y$ cannot exceed one forward-biased diode drop $V_f$ above the battery input $V_{batt}$ without forward biasing P-N diode 14 and being clamped to a voltage $(V_{batt}+V_f)$. In the disclosed converter 10, inductor 12 cannot drive the $V_y$ node voltage above $V_{batt}$, so that only switching noise can cause diode 14 to become forward biased.

Within the specified operating voltage range of the related devices, however, $V_y$ can operate at voltages less positive than $V_{batt}$ and can even operate at voltages below ground, i.e. $V_y$ can operate at negative potentials.

The most negative $V_y$ potential is limited by the $BV_{DSS7}$ breakdown of high-side MOSFET 13, a voltage corresponding to the reverse bias avalanche of intrinsic P-N diode 14. To avoid breakdown, the MOSFET's breakdown must exceed the maximum difference between $V_y$, which may be negative, and $V_{batt}$, i.e. $BV_{DSS7} > (V_{batt} - V_y)$. The maximum operating voltage range of $V_y$ is then bounded by the breakdown and forward biasing of diode 14 given by the relation $$(V_{batt}+V_f) > V_y > (V_{batt} - BV_{DSS7})$$

Similarly, node $V_x$ cannot be biased beyond one forward-biased diode drop $V_f$ below ground without forward biasing P-N diode 15 and being clamped to a voltage $V_x = -V_f$. In the disclosed converter 10, however, inductor 12 cannot drive the $V_x$ node voltage below ground, so that only switching noise can cause diode 15 to become forward biased.

Within the specified operating voltage range of the related devices, however, $V_x$ can operate at voltages above ground and typically operates at voltages more positive than $V_{batt}$. The most positive $V_x$ potential is limited by the $BV_{DSS6}$ breakdown of low-side MOSFET 11, a voltage corresponding to the reverse bias avalanche of intrinsic P-N diode 15. To avoid breakdown, the MOSFET's $BV_{DSS7}$ breakdown must the maximum of positive voltage of $V_x$, which should exceed $V_{batt}$, i.e. $BV_{DSS6} > V_x$. The maximum operating voltage range of $V_x$ is then bounded by the breakdown and forward biasing of diode 15 given by the relation $$BV_{DSS6} > V_x > (-V_f)$$

With the $V_y$ terminal of inductor 12 being able to operate at voltage below ground and the $V_x$ terminal of inductor 12 being able to operate above $V_{batt}$, the circuit topology of disclosed dual-polarity boost converter 10 is significantly different than conventional boost converter 1 which can only operate above ground and has its inductor hard wired to its positive input voltage. Since inductor 12 is not hard-wired to any supply rail, the disclosed dual-polarity boost converter can therefore be considered a "floating inductor" switching converter. A conventional boost converter is not a floating inductor topology.

Operation of the disclosed dual-polarity boost converter involves alternating between magnetizing the inductor and then transferring energy to the outputs, before magnetizing the inductor again. Energy from the inductor may be transferred to both positive and negative outputs simultaneously or in alternating fashion.

Whenever energy is transferred to the positive outputs, the inductor current is multiplexed sequentially to the positive outputs $+V_{OUT1}$, $+V_{OUT2}$, and $+V_{OUT3}$ charging each output completely or partially to their target voltages. The sequencing of the positive outputs may occur in any order independent of the charging of the converter's negative outputs.

Similarly, whenever energy is transferred to the converter's negative outputs, the inductor current is multiplexed sequentially to the negative Outputs $-V_{OUT4}$ and $-V_{OUT5}$ charging each output completely or partially to their target voltages. The sequencing of the negative outputs may occur in any order independent of the charging of the converter's positive outputs.

Regardless of the algorithm employed for time multiplexing the various outputs, the first step in the operation of the disclosed dual-polarity boost converter is to store energy in, or herein to "magnetize", the inductor, a process similar to charging a capacitor except the energy is stored in a magnetic rather an electric field.

Figure 3A:
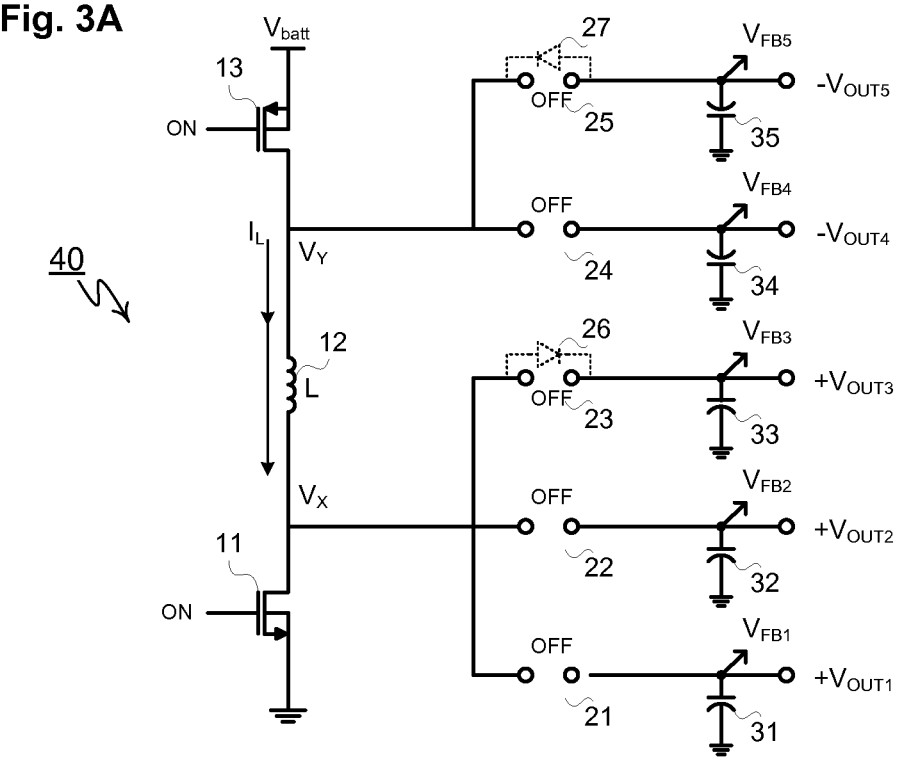
FIGS. 3A-3D show the boost converter of FIG. 2 performing an operational sequence that implements a mode referred to as synchronous transfer. Synchronous transfer mode includes the following example successive operational phases: the inductor is magnetized (3A), charge is synchronously transferred to both $+V_{OUT1}$ and to $-V_{OUT4}$ (3B), charge is synchronously transferred to both $+V_{OUT2}$ and to $-V_{OUT5}$ (3C), and finally charge continues to be transferred exclusively to $+V_{OUT3}$ (3D).

Inductor Magnetizing, FIG. 3A illustrates operation 40 of converter 10 during the magnetizing of inductor 12. Since inductor 12 is connected to battery input $V_{batt}$ through not one, but two series connected MOSFETs, then both low-side and high-side MOSFETs 11 and 13 must be turned on simultaneously to allow current $I_L(t)$ to ramp. Meanwhile synchronous rectifier MOSFETs 21 through 25 remain off and non-conducting. The current-voltage relationship for an inductor is given by the differential equation $$V_L = L\frac{dI}{dt}$$

which for small intervals can be approximated by the difference equation $$V_L \cong L\frac{\Delta I}{\Delta t}$$

Assuming minimal voltage drop across on-state MOSFETs 11 and 13, then $V_L \approx V_{batt}$ and the above equation can be rearranged as $$\frac{\Delta I}{\Delta t} = \frac{V_L}{L} \approx \frac{V_{batt}}{L}$$

which describes for short magnetizing intervals the current $I_L(t)$ in inductor 12 can be approximated as a linear ramp of current with time. For example as shown in graph 90 of FIG. 4, during the interval between $t_0$ and $t_1$ the current $I_L$ ramps linearly 91 from some non-zero current at time $t_0$ toward a peak value 92 at time $t_1$, the end of the magnetizing operating phase. The energy stored in inductor 12 at any time t is given by $$E_L(t) = \frac{LI^2(t)}{2}$$

reaching its peak $E_L(t_1)$ just before its current is interrupted by switching off one or both MOSFETs 11 and 13. As shown in graphs 60, 75 and 90 of FIG. 4, during magnetizing the current $I_6$ in low-side MOSFET 11 and the current 17 in high-side MOSFET 13 are identical and equal to the inductor current $I_L$ so that in the interval $t_0$ to $t_1$, $$I_6(t)=I_7(t)=I_L(t)$$

Figure 4:
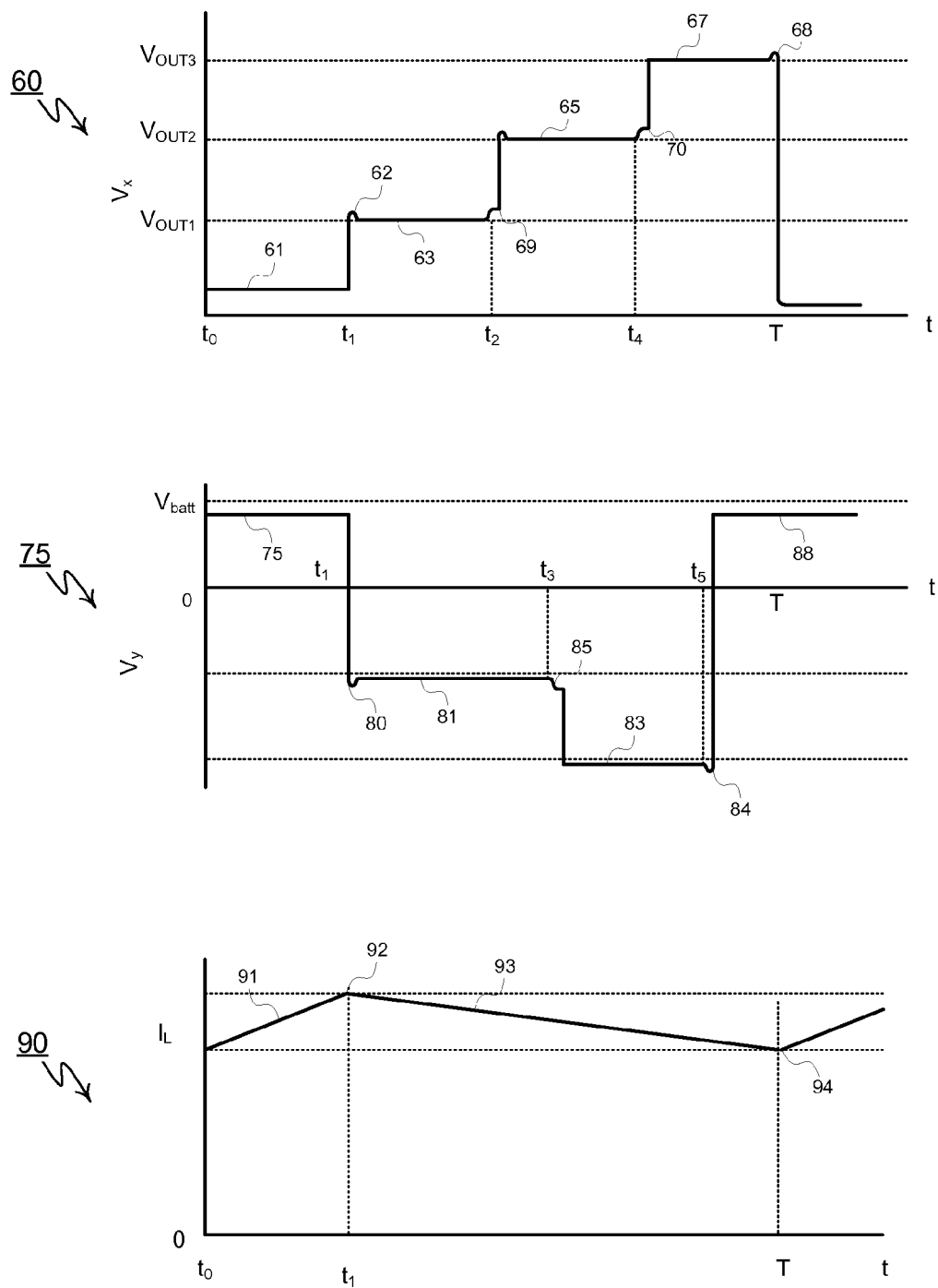
FIG. 4 comprises current and voltage plot of switching-waveforms characteristic of the boost converter of FIG. 2 operating in synchronous transfer mode.

At current $I_6(t)$, a small voltage drop $V_{DS2(on)}$ appears across series-connected low-side N-channel MOSFET 11. Operating in its linear region and carrying current $I_L(t)$ with an on-state resistance of $R_{DS6(on)}$ the voltage $V_x$ is given by $$V_x = V_{DS6(on)} = I_L \cdot R_{DS6(on)}$$

as shown by line 61 in graph 60 of FIG. 4. For low on-resistances, typically a few hundred milliohms or less, then $V_x$ is approximately equal to ground potential, i.e. $V_x \approx 0$. Similarly, a small voltage drop $V_{DS7(on)}$ also appears across series-connected high-side P-channel MOSFET 13. Operating in its linear region at a current $I_L(t)$ with an on-state resistance of $R_{DS7(on)}$ the voltage $V_y$ is then given by $$V_y = V_{batt} - V_{DS7(on)} = V_{batt} - I_L \cdot R_{DS7(on)}$$

as shown by line 52 in graph 75 of FIG. 4. For low on-resistances, then $V_y$ is approximately equal to the battery potential, i.e. $V_y \approx V_{batt}$.

Given that $V_x \approx 0$ and $V_y \approx V_{batt}$ then the approximation $V_L = (V_y - V_x) \approx V_{batt}$ is a valid assumption. Accordingly, the ramp in inductor current shown in graph 90 can, as described previously, therefore be approximated as a straight line segment with a slope ($V_{batt}/L$). Furthermore assuming the voltage $+V_{OUT3}$ across capacitor 31 is above ground and the voltage $-V_{OUT5}$ across capacitor 35 is below ground, then $+V_{OUT3}>V_x$ and $V_y>-V_{OUT5}$ so that P-N diodes 26 and 27 are both reverse biased and non-conducting.

Figure 3B:
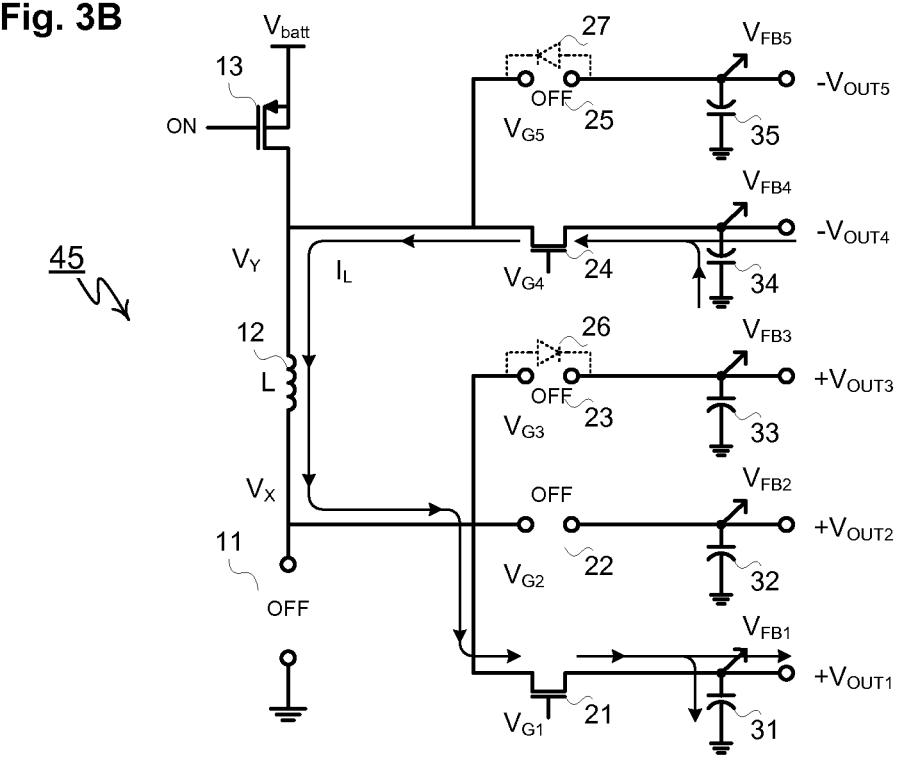

Synchronous Energy Transfer to Dual Polarity Outputs: After magnetizing inductor 12, in the synchronous transfer algorithm both low-side and high-side MOSFETs 11 and 13 are turned off simultaneously, as shown at time $t_1$ of FIG. 4. Interrupting the $I_7$ current in high-side MOSFET 13 and the $I_6$ current in low-side MOSFET 11 causes the inductor's $V_x$ terminal to fly up to a positive voltage 63 greater than $V_{OUT1}$, forward biasing diode 26. Before any appreciable energy flows to capacitor 33 and output $+V_{OUT3}$, MOSFET 21 turns on and reroutes the current to capacitor 31 and output $+V_{OUT1}$ as shown in FIG. 3B. The voltage $V_x$ then settles to a voltage 63 only slightly above $+V_{OUT1}$, the product of the inductor current and the on-resistance of synchronous rectifier MOSFET 21. i.e. $I_L R_{DS1}$.

As shown in FIG. 3B synchronous to inductor 12 transferring energy to capacitor 31, the same inductor also charges capacitor 34 to a negative potential. Specifically at time $t=t_1$ as shown in graph 75 of FIG. 4 the inductor's $V_y$ terminal voltage flies down to a below-ground voltage 80, a voltage more negative than $-V_{OUT5}$, momentarily forward biasing diode 27. Before any appreciable energy is transferred to capacitor 35, MOSFET 24 is turned on reroutes the inductor's current to the negative voltage output $-V_{OUT4}$. The voltage $V_Y$ then settles to a voltage 81 only slightly below $-V_{OUT4}$, the product of the inductor current and the on-resistance of synchronous rectifier MOSFET 24. i.e. $I_L R_{DS4}$.

During the transition at time $t_1$, break-before-make circuits 17 and 18 prevents synchronous rectifier MOSFETs 21 and 24 from turning on and momentarily shorting out filter capacitors 31 and 34. Without MOSFET conduction, diodes 26 and 27 carry the inductor current $I_L$ and exhibit a forward-biased voltage-drop $V_f$. In the absence of stray capacitance in the circuit, the instantaneous voltage 62 on $V_x$ during the BBM interval is then equal to $(V_{OUT3}+V_f)$. The instantaneous voltage 80 on $V_y$ is similarly equal to $(-V_{OUT5}-V_f)$. If however, the BBM interval is sufficiently short, stray capacitance filters the voltage spikes 62 and 80 on $V_X$ and $V_Y$ to a magnitude slightly larger than $+V_{OUT1}$ and $-V_{OUT4}$. As a result, no significant energy flows to capacitors 33 and 35 during the BBM interval and the output voltages $+V_{OUT3}$ and $-V_{OUT5}$ are not disturbed.

Since no significant power flows through them, the function of diodes 26 and 27 is to act as a clamp to prevent short unwanted spikes and related noise on the $V_X$ and $V_Y$ and to avoid driving MOSFETs 11 and 13 into a potentially harmful unclamped-inductively-switched avalanche condition. In graphs 60 and 75 theses short BBM intervals are represented as temporary $V_X$ voltage transients 62, 68, 69, 70 and temporary $V_Y$ voltage transients 80, 84 and 85.

After the BBM interval at time $t_1$, the positive and negative outputs $+V_{OUT1}$ and $-V_{OUT4}$ charge simultaneously during which inductor 12 essentially decouples the voltage at nodes $V_x$ and $V_y$ allowing them to act independently during the time energy is transferred to the loads and to output capacitors 31 and 34 through the synchronous rectifier MOSFETs 21 and 24.

In one method, the condition shown in schematic 3B should continue until the voltage on either capacitor 31 or 34 comes into a specified tolerance range. The tolerance range of the target voltage is determined by the controller in response to the feedback signals $V_{FB1}$ and $V_{FB4}$. Using analog control, the PWM controller 16 includes an error amplifier, a ramp generator, and a comparator to determine when to shut off each synchronous rectifier. Using digital control, this decision can be made by logic or software according a specified algorithm, depending on the load current demand and capacitor voltage on each output.

For example when the positive output $+V_{OUT1}$ reaches its target voltage at time $t_2$, positive synchronous rectifier MOSFET 21 is turned off discontinuing charging of capacitor 31. After a BBM interval MOSFET 22 is turned on and capacitor 32 then commences charging of output voltage $+V_{OUT2}$. The voltage $V_X$ then increases to $(+V_{OUT2}+I_L R_{DS2})$ as shown by line 65 in graph 60.

Figure 3C:
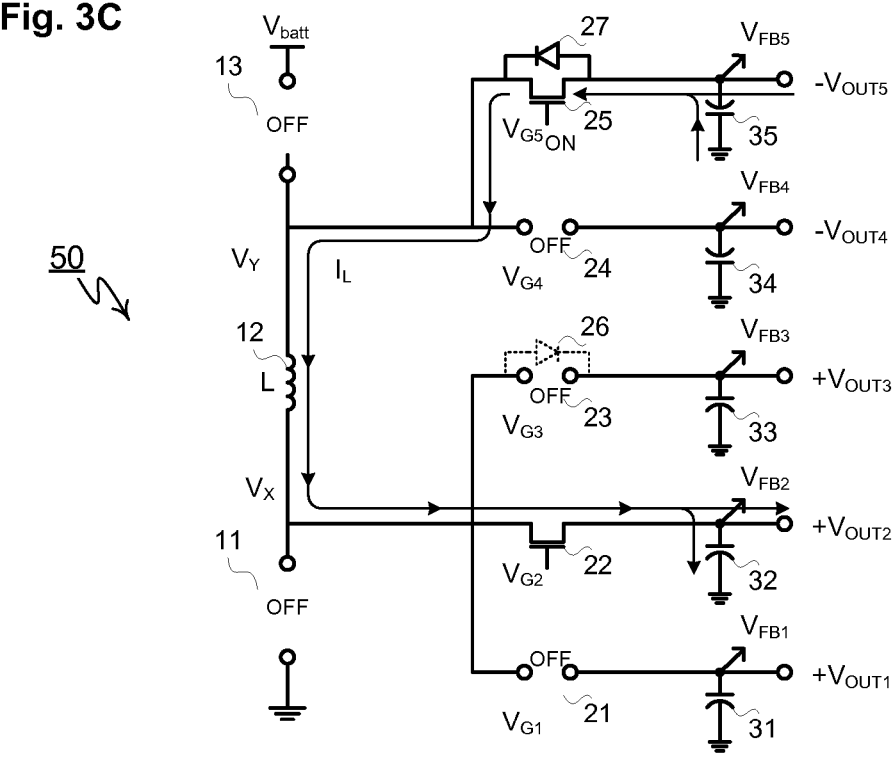

At a later time, i.e. at time $t_3$, the negative output $-V_{OUT4}$ reaches its specified tolerance range, synchronous rectifier MOSFET 24 is turned off. After a BBM interval, MOSFET 25 is turned on and capacitor 35 commences charging of output $-V_{OUT5}$. Charging of capacitor 32 and voltage $+V_{OUT2}$ continues. This condition 50 from time $t_4$ to $t_5$ is illustrated in FIG. 3C during which the voltage $V_X$ then increases to $(+V_{OUT3}+I_L R_{DS3})$ as shown by line 75 in graph 60 and where $V_Y$ increases to $(-V_{OUT5}-I_L R_{DS5})$ as shown by line 83 in graph 75.

Synchronous Energy Transfer to One Polarity Output: Depending on load conditions either positive or negative polarity outputs may become fully charged within their tolerance ranges first. Once either output reaches its specified output voltage, the converter is again reconfigured to discontinue charging of the fully charged polarity but continue charging the output capacitors not yet within the tolerance range its specified voltage target.

For example, if at a time $t_5$ the negative output $-V_{OUT5}$ reaches its target voltage before $+V_{OUT3}$, then the first action is to turn off synchronous rectifier MOSFET 25, and disconnect capacitor 35 from over charging. After BBM interval 59 is completed, high-side MOSFET 13 is turned-on and $V_y$ jumps to a voltage of $V_{batt}-I_L \cdot R_{DS7(on)}$ shown by line 56 in graph 60. During the hand-off at time $t_5$, inductor current $I_L$ is diverted from $I_5$ to $I_7$ in the transition shown by point 84 in graph 74. Current $I_3$ however remains unchanged.

Figure 3D:
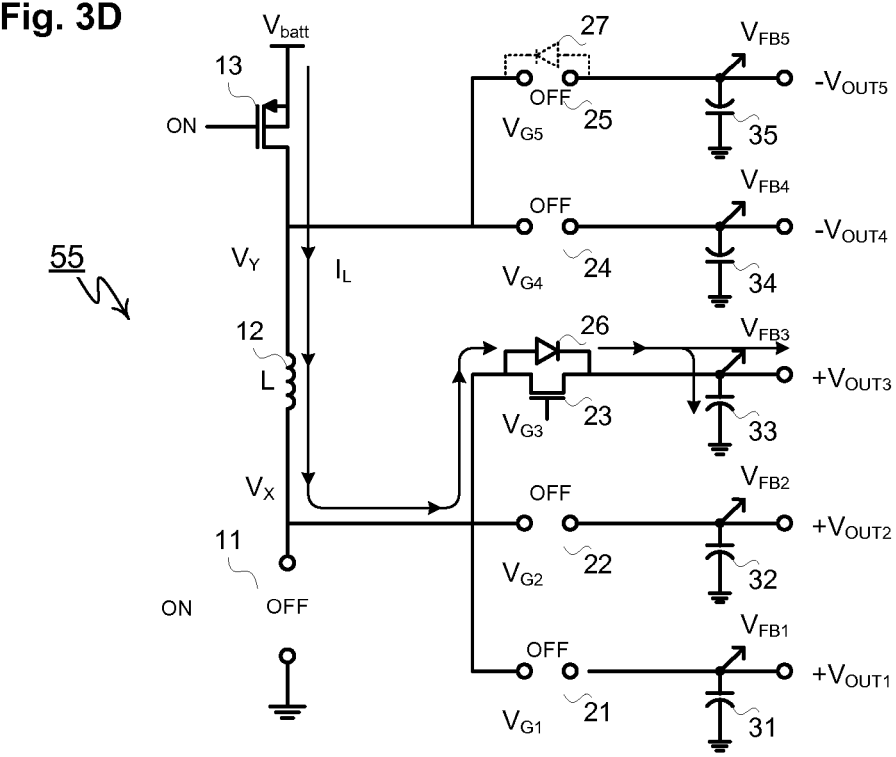

This condition is shown in circuit 55 of FIG. 3D where the current path of $I_L$ flows from $V_{batt}$ through conducting high-side MOSFET 13, inductor 12, and on-state positive synchronous rectifier 23 so that $I_L = I_7 = I_3$. Capacitor 33 therefore continues to charge even though charging of capacitor 35 has stopped. With $V_y$ biased near $V_{batt}$ and $-V_{OUT5}$ below ground P-N diode 27 remains reversed biased and non-conducting.

The operating phase of circuit 35 is maintained until $+V_{OUT3}$ reaches its target voltage at time T. Once $+V_{OUT3}$ is at its target voltage, positive synchronous rectifier MOSFET 23 is turned off and for the break-before-make duration $t_{BBM}$ 68, diode 26 carries the inductor current.

Once however the BBM interval 68 is completed low-side MOSFET 11 is turned on, current is diverted from $I_3$ to $I_6$ and inductor 12 begins a new cycle of being magnetized returning to the state shown in circuit 40. Having completed the cycle, the total time is described as the period T which will vary depending on load current. This period is determined by the magnetizing duration and the positive or negative charge transfer phases which ever is longer.

The example given in FIG. 3D described a case where the negative Output $-V_{OUT5}$ reached its target voltage before the positive Output $+V_{OUT3}$. The converter also accommodates the opposite scenario, i.e. when the positive voltage hits its point of regulation first.

As shown in graph 90 in the synchronous transfer method, the inductor 12 must supply all five outputs with charge over an interval from $t_1$ to T with the inductor current decaying 93 from a peak current 92 to a minimum value 94 before the cycle repeats. For conservation of energy, the magnetizing energy during the interval $t_0$ to $t_1$ must equal the energy delivered in the remainder of the period.

Figure 5:
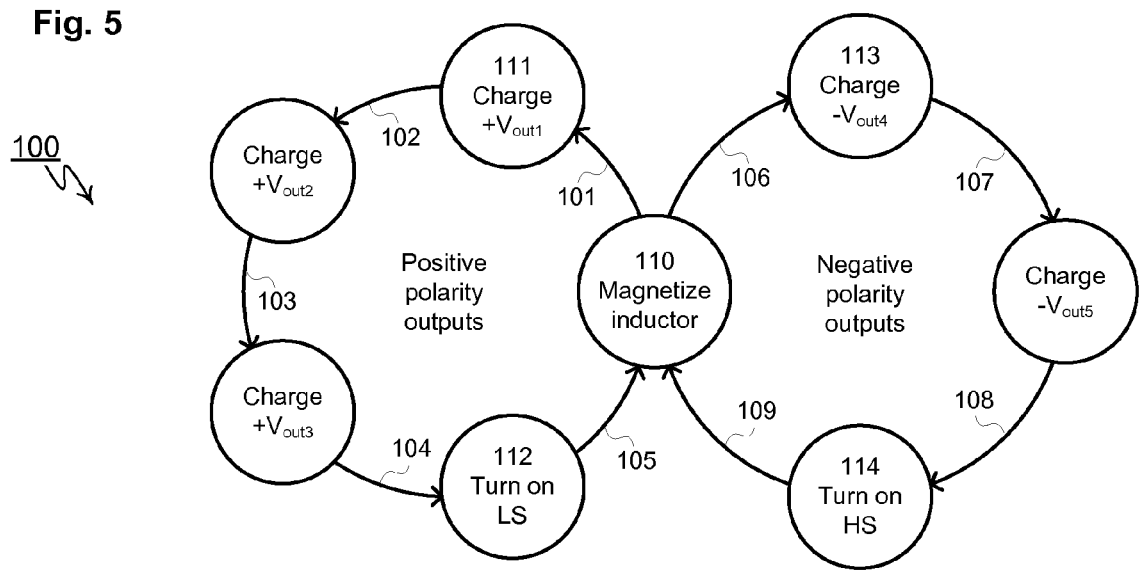
FIG. 5 is a flowchart for the boost converter of FIG. 2 using synchronous transfer mode.

State Diagram of Synchronous Charge Transfer The algorithm and state diagram for synchronous transfer 100 is illustrated in FIG. 5. As shown the initial state 110 involves magnetizing the inductor, then simultaneously operations 101 and 106 power both negative and positive outputs by turning off the high side and low side MOSFETs 11 and 13 and time multiplexing the synchronous rectifiers. In flow 101, 102, 103 the positive polarity outputs $+V_{OUT51}$, $+V_{OUT2}$, and $+V_{OUT3}$ are charged 111 sequentially as shown or in any sequence. In tandem to charging the positive outputs, in flow 106, 107 the converter's negative outputs are charged in any sequence.

The charging of the converter's positive outputs is controlled by the low-side MOSFET 11 connected between ground and $V_X$. Turning off MOSFET 11 commences charging according to multiplexed sequence 101, 102, and 103. To terminate positive charging 104, low side MOSFET 11 must be turned back on in state 112. The result is conditional. If high side MOSFET 13 is already on, then turning on low side MOSFET 112 will re-initiate 105 magnetizing inductor 12 shown by state 110. If the high side MOSFET is still off, i.e. if negative charging sequence 106, 107 is still ongoing, then the positive loop will wait in condition 112.

Similarly, the charging of the converter's negative outputs is controlled by the high-side MOSFET 13 connected between $V_{batt}$ and $V_Y$. Turning off MOSFET 13 commences charging of the negative outputs 113 according to multiplexed sequence 106 and 107. To terminate negative charging 108, high side MOSFET 13 must be turned back on in state 114. The result is conditional. If low side MOSFET 11 is already on, then turning on low side MOSFET 115 will re-initiate 109 magnetizing inductor 12 shown by state 110. If the low side MOSFET is still off, i.e. if the positive charging sequence 101, 102, 103 is still ongoing, then the negative loop will wait in condition 114.

In the synchronous transfer method, both loops in algorithm 100 occur simultaneously, the longer loop sets the duration of the repeated interval, i.e. the converter's period T. For example if the negative charge transfer sequence 106, 107, 108 occurs in a shorter time than the positive loop 101, 102, 103, 104, the negative loop will wait at state 114 with its high side MOSFET on until the positive loop reaches state 112. When state 112 finally is reached, then the converter returns to the starting condition by paths 105 and 109 simultaneously.

Conversely, if the positive charge transfer sequence 101, 102, 103, 104 occurs in a shorter time than the negative loop 106, 107, 108, the positive loop will wait at state 112 with its low side MOSFET on until the negative loop reaches state 114. When state 114 finally is reached, then the converter returns to the starting condition by paths 105 and 109 simultaneously.

In the disclosed approach, charging is synchronous because both high side and low side MOSFETs are turned off simultaneously thereby immediately forcing both sides of the inductor $V_X$ and $V_Y$ to exhibit voltage transients an charging their respective outputs.

An alternative approach is to alternate between the positive and the negative loops, first by magnetizing the inductor, turning off only the low side MOSFET and completing positive output loop 101, 102, 103, 104, 105, returning to magnetizing state 110, turning off only the high side MOSFET, completing negative output loop 106, 107, 108, 109, and then repeating the entire process.

Voltage Regulation of the Dual-Polarity Multiple Output Regulator: Operation of the dual polarity boost converter requires turning on both high-side and low-side MOSFETs 13 and 11 to magnetize inductor 12 and then shutting off these MOSFETs to transfer energy to the converters outputs. In the synchronous energy transfer algorithm, both aforementioned high-side and low-side MOSFETs are shut off simultaneously starting the transfer of energy from the inductor to both outputs simultaneously.

Despite being charged synchronously, independent regulation of the positive and negative outputs are determined by the duration of energy transfer to each output. Specifically, by controlling the off-time of the low-side and high-side MOSFETs 11 and 13 and the relative on-time for each of the synchronous rectifier MOSFETs through feedback, the various positive and negative output voltages may be independently regulated from a single inductor.

Time Multiplexed Sequencing In the disclosed invention, any time multiplexed sequence may be used for producing the multiple positive or multiple negative outputs. For example in FIG. 6, the positive outputs are charged in successive monotonic sequence starting with the lowest output voltage +$V_{OUT1}$, progressing to the second output +$V_{OUT2}$, and finally charging the highest output voltage +$V_{OUT3}$. The graph illustrates the initial charging of the output capacitors during start up, not just steady state operation.

More specifically from time $t_0$ to $t_1$ sub-circuit 140 illustrates the low-side MOSFET 11 is on and the synchronous rectifiers are off. All three output voltages 131 in graph 130 are at zero and $V_X$ in graph 120 has a potential 121 equal to the voltage drop $I_L R_{DS(on)}$ across the conducting low side MOSFET 11.

After MOSFET 11 is shut off at time $t_1$, synchronous rectifier 21 shown in sub-circuit 141 is turned on and +$V_{OUT1}$ ramps 132 to its target voltage V'$_{OUT1}$. At the same time diode 26 becomes forward biased ramping +$V_{OUT3}$ to value of (+$V_{OUT1}$−$V_f$). The inductor node voltage $V_X$ drives the outputs voltage up with a ramp 122 limited by the charging of the converter's output capacitances. During this period, +$V_{OUT2}$ remained at ground.

At time $t_2$ MOSFET 21 is turned off and MOSFET 22 is turned on as shown in sub-circuit 142. As $V_x$ continues 123 to rise, the output voltage +$V_{OUT2}$ charges to a target voltage V'$_{OUT2}$ and the forward biasing of diode 26 continues to ramp output +$V_{OUT3}$ to value of (+$V_{OUT2}$−$V_f$) as shown by line 135. With MOSFET 21 off, the output +$V_{OUT1}$ remains constant at its targeted value V'$_{OUT1}$.

At time $t_3$ MOSFET 22 is turned off and MOSFET 23 is turned on as shown in sub-circuit 143. As $V_x$ continues 124 to rise, the output voltage +$V_{OUT3}$ charges 138 to a target voltage V'$_{OUT3}$ with MOSFET 23 shunting forward biased diode 26. With MOSFETs 21 and 22 off, the lower voltage outputs +$V_{OUT1}$ and +$V_{OUT2}$ remain constant at or near their targeted values V'$_{OUT1}$ and V'$_{OUT2}$.

After time T, the circuit enters steady state operation with only small changes in the converter's outputs manifest thereafter.

Figure 7:
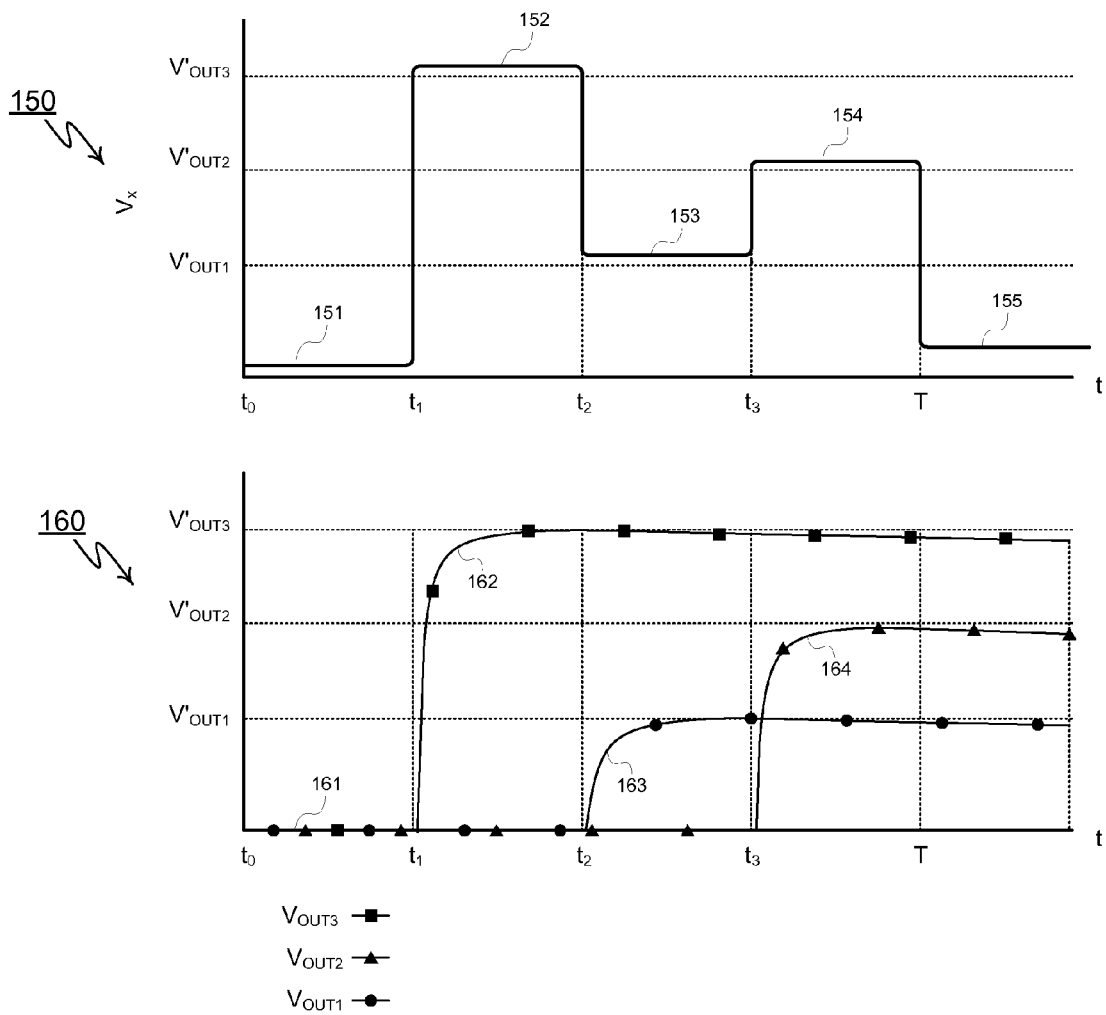
FIGS. 7 illustrates a another embodiment of the switching waveform of the boost converter of FIG. 2 showing an alternative time multiplexed sequence charging on the positive output nodes.

An alternative multiplexing sequence, one where the $V_X$ voltage does not ramp monotonically, is illustrated in FIG. 7 where graph 150 illustrates $V_X$ and graph 160 illustrates the various output voltages. Specifically, before time $t_1$, the inductor is magnetizing, $V_X$ is biased near ground, and all three outputs are zero.

At time $t_1$, the low side MOSFET is turned off and MOSFET 23 is turned on, whereby the converter's highest output-voltage +$V_{OUT3}$ rises 162 toward its target value V'$_{OUT3}$ driving by $V_X$ voltage 152. Other outputs +$V_{OUT1}$ and +$V_{OUT2}$ remain grounded.

At time $t_2$, the converter's lowest output voltage +$V_{OUT1}$ is next powered ramping 163 in proportion to $V_X$ 153 toward a target value of V'$_{OUT1}$. The output +$V_{OUT2}$ remains grounded. Because the output +$V_{OUT3}$ is fully charged, P-N diode 26 becomes reverse biased.

At time $t_3$ the converter's median output voltage +$V_{OUT2}$ is next powered ramping 164 in proportion to $V_X$ 154 toward a target value of V'$_{OUT2}$. The outputs +$V_{OUT1}$ and +$V_{OUT1}$ remain at their previous values. Because the output +$V_{OUT3}$ is fully charged, P-N diode 26 remains reverse biased.

So the disclosed converter's initial multiplexing sequence can be implemented without concern for special sequencing for monotonic operation.

In the example of circuit 10 operation, in steady state operation only one positive and one negative synchronous rectifier are turned on at a time. Specifically as shown whenever low-side MOSFET 11 is biased off and the voltage at node $V_x$ increases, only one positive-output connected synchronous rectifier MOSFET, either MOSFET 21, 22 or 23 is turned on at the same time. Similarly, whenever high-side MOSFET 13 is turned off and $V_Y$ flies negative, only one negative-output connected synchronous rectifier MOSFET, either MOSFET 24 or 25 is turned on at the same time. Turning on more than one synchronous rectifier would in effect short out the affected outputs and cause the voltages to equilibrate.

For example simultaneously turning on synchronous rectifier MOSFETs 21, 22 and 23 will cause the voltage to equilibrate among capacitors 31, 32 and 33. The adverse effect of voltage equilibration is that charge flows "backwards" from the highest output voltage capacitor into the lowest voltage capacitor lowering converter efficiency and increasing output ripple or causing noise spikes on the affected outputs. If, during such as condition $V_{OUT3} > V_{OUT2}$, then by simultaneously turning on MOSFETs 23 and 22, capacitor 32 would be charged by a combination of both inductor 12 current and capacitor 33 current causing $V_{OUT2}$ to rise and $V_{OUT3}$. to drop in voltage. Energy redistribution among the filter capacitors is less efficient than supplying new charge to the outputs from inductor 12 current as need.

Similarly, simultaneously turning on synchronous rectifier MOSFETs 24 and 25 will cause the voltage to equilibrate among capacitors 34 and 35. The adverse effect of voltage equilibration is that charge flows "backwards" from the highest, i.e. the most negative, output voltage capacitor into the lowest voltage capacitor. Such currents lower converter efficiency and increase output ripple and noise spikes on the affected outputs. If, during such as condition −$V_{OUT5} < -V_{OUT4}$, then by simultaneously turning on MOSFETs 24 and 25, capacitor 34 would be charged by a combination of both inductor 12 current and capacitor 35 current causing −$V_{OUT5}$ to rise and −$V_{OUT3}$. to drop, i.e. be come less negative, in voltage. Energy redistribution among the filter capacitors is less efficient than supplying new charge to the outputs from inductor 12 current as need.

Since the positive and negative outputs are connected to opposite terminals $V_X$ and $V_Y$ of inductor 12, the selection or sequence of positive-output connected synchronous rectifiers places no limitations on which negative-output connected synchronous rectifier MOSFET is conducting in tandem, or vice versa. As long as only one positive-output connected MOSFET and only one negative output connected MOSFET are conducting, no intra-capacitor charge redistribution will occur and efficiency will not be lost.

Although turning on multiple synchronous rectifiers of the same polarity does not necessarily damage the devices of circuit 10 or prevent regulation, it offers no technical merit and generally suffers a number of the aforementioned problems.

One condition, however, allows the outputs to be shorted by multiple conducting synchronous rectifiers without causing charge redistribution losses in the capacitors. This condition occurs during start up when the capacitors are being charged for the first time. As long as the capacitor voltages are similar all the synchronous rectifiers may be turned on in tandem and allow the inductor to simultaneously charge every positive and negative output. This process expedites turn on and ramp up of the converter to its steady state. Once a given output capacitor reaches its target range, it is disconnected from the inductor while the other channels continue to charge. Once disconnected the isolated capacitor will quickly exhibit its own unique output voltage and thereafter may be not be reconnected in parallel with the other outputs without charge redistribution losses occurring.

Other Features of the Dual Polarity Multi-Output Converter One feature of the disclosed converter 10 is that since the inductor is floating, i.e. not permanently connected to a supply rail, turning on either the high-side or low-side MOSFETs 11 and 13 but not both can force the voltage at $V_y$ or $V_x$ without magnetizing or increasing the current in inductor 12. This is not possible for a conventional boost converter like the one in FIG. 1 where a single MOSFET both controls the $V_x$ voltage but also causes current conduction, magnetizing the inductor. In other words in a conventional converter, controlling the inductor voltage also causes additional and sometimes unwanted energy storage. In the disclosed converter, either $V_x$ or $V_y$ can be forced to a supply voltage without magnetizing the inductor.

Another consideration is the output voltage range of conventional boost converter 1. If a P-N diode 6 is present across a synchronous rectifier MOSFET, the minimum output voltage for the boost converter's output is necessarily $V_{batt}$, because the diode forward biases pulling the output up to $V_{batt}$ as soon as power is applied to the regulator's input terminals. In the disclosed dual output converter, the circuit path from $V_X$ to $+V_{OUT1}$ or to $+V_{OUT2}$ includes MOSFETs with no source-drain parallel P-N diodes, allowing $+V_{OUT1}$ or $+V_{OUT2}$ to regulate a voltage less than $V_{batt}$, a feature not possible with a conventional boost converter topology.

So while boost converters can only step up voltage, the disclosed converter produces a positive output voltage that can be less than, equal to or greater than the battery voltage, and is therefore not restricted to operation only above $V_{batt}$. Adapting a boost converter's topology for step-down voltage regulation is the subject of a related patent by Richard K. Williams entitled "High-Efficiency Up-Down and Related DC/DC Converters" (now U.S. patent application Ser. No. 11/835,809) and is included herein by reference.

In a related disclosure entitled "Dual-Polarity Multi-Output DC/DC Converters and Voltage Regulators" (now U.S. patent application Ser. No. 11/890,818) by Richard K. Williams, the application of a time-multiplexed-inductor in both positive and negative output boost converters is described and is incorporated herein by reference.

Multiplexer Implementation The disclosed dual polarity multi-output converter requires the use of MOSFETs free from parasitic source-to-drain diodes. In order to implement power MOSFETs without intrinsic source to drain diodes, a number of methods are herein disclosed. Once such method illustrated in sub-circuit 180 of FIG. 8 comprises P-channel MOSFETs with integral body bias generator circuitry.

As shown P-channel MOSFETs 21 and 22 include associated body bias generator or BBG circuits 191A and 181A respectively BBG circuit 191A comprises cross coupled MOSFETs 192 and 193 sharing a common body connection to main P-channel MOSFET 21, the body which represents the cathode of intrinsic diodes 194 and 195. In its integrated version BBG circuit 191A contained in an N-type well or tub may include a parasitic diode 191B to ground. BBG circuit 181A is of similar construction to 191A.

Operation of BBG circuit selectively shunts diodes 194 and 195 so that neither diode can become forward biased and carry current regardless of the polarity of the source-drain terminals of MOSFET 21. For example if $V_{OUT1} > V_X$, then the gate of P-channel MOSFET 193 is more negative than its other terminals so that P-channel 193 is on, shunting P-N diode 195. The body of P-channel MOSFET 21 is therefore connected to $V_{OUT1}$, the most positive device potential. Consequently, diode 194 remains reversed biased and non-conducting. P-channel 192, with its gate to the most positive potential also remains off. Since the device and circuit are symmetric the argument applies equally in both polarities. As a result BBG circuit 191A makes MOSFET 21 appear as if it has no parallel P-N diode that can ever become forward biased.

In circuit 180, while MOSFETs 21 and 22 use BBG circuits 191A and 181A to prevent body diode conduction, MOSFET 23 connected to the most positive output voltage $+V_{OUT3}$, does not require a BBG circuit. In fact parallel diode 26 is important as insurance to prevent $V_x$ from large voltage spikes.

In integrated form the N-well or epitaxial layers 181A and 191A forming the body of the P-channel MOSFETs also form parasitic diodes 181B and 191B to the surrounding P-type substrate. Since $V_X$ is always positive, these diodes remain reverse biased during normal operation of body bias generator circuitry 180.

A similar approach to circuit 180 can be employed using N-channel power MOSFETs in place of P-channel devices but the gate drive circuitry must be modified accordingly for bootstrap circuitry with a floating bootstrap capacitor. Generally a special wafer fabrication process is required to isolate N-channel MOSFETs from a surrounding P-type substrate. A P-type substrate is common in most wafer fabrication processes, especially in conventional CMOS processes.

Figure 9:
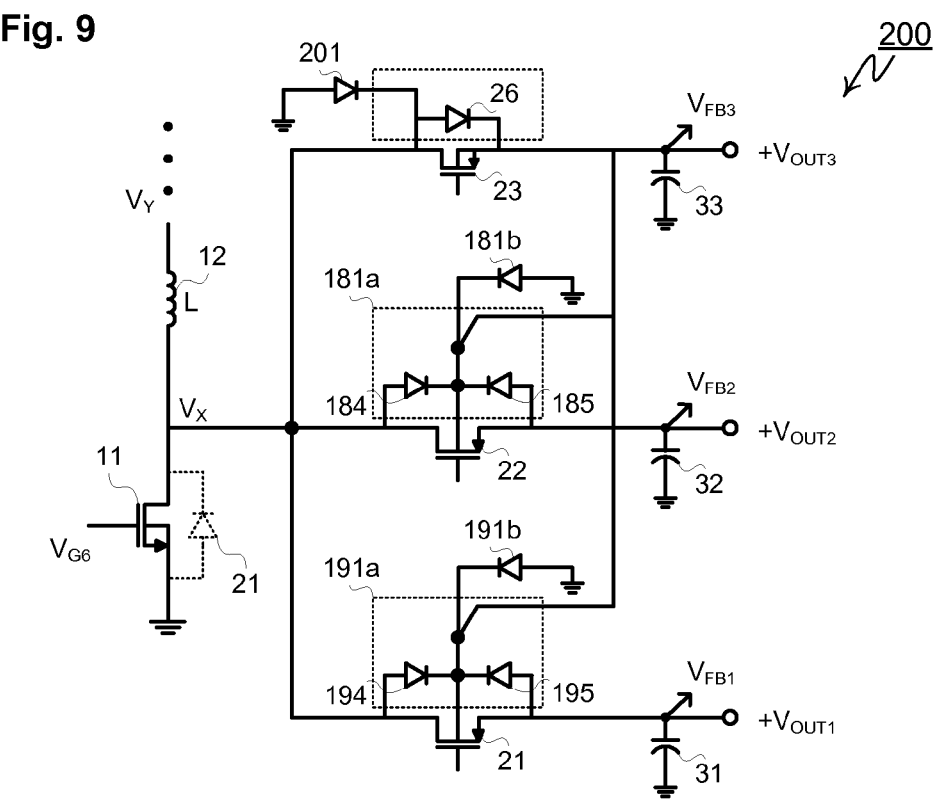
FIG. 9 illustrates an alternate implementation of the boost converter of FIG. 2 using P-channel MOSFETs as synchronous rectifiers to supply the positive output nodes without requiring adaptive body bias circuitry.

Alternate P-channel solution 200 shown in FIG. 9 utilizes the knowledge that the output $+V_{OUT3}$ is the most positive potential and can be used to avoid diode conduction in MOSFETs 21 and 22. As such P-channel MOSFET 21 includes intrinsic body diodes 194 and 195 with cathode and N-type well region 191A electrically tied to $+V_{OUT3}$, the circuit's most positive potential. Similarly P-channel MOSFET 22 includes intrinsic body diodes 184 and 185 with cathode and N-type well region 181A electrically tied to $+V_{OUT3}$, the circuit's most positive potential. Because N-type wells 181A and 191A are biased at the highest potential, i.e. at $+V_{OUT3}$, then in an integrated form parasitic diodes 181B and 191B to the surrounding P-type substrate remain off and reversed-biased during normal circuit operation. One disadvantage of circuit 200 compared to the BBG method of circuit 180 is the reverse biased source to body bias will result in an increase in threshold voltage and on-resistance.

Figure 10:
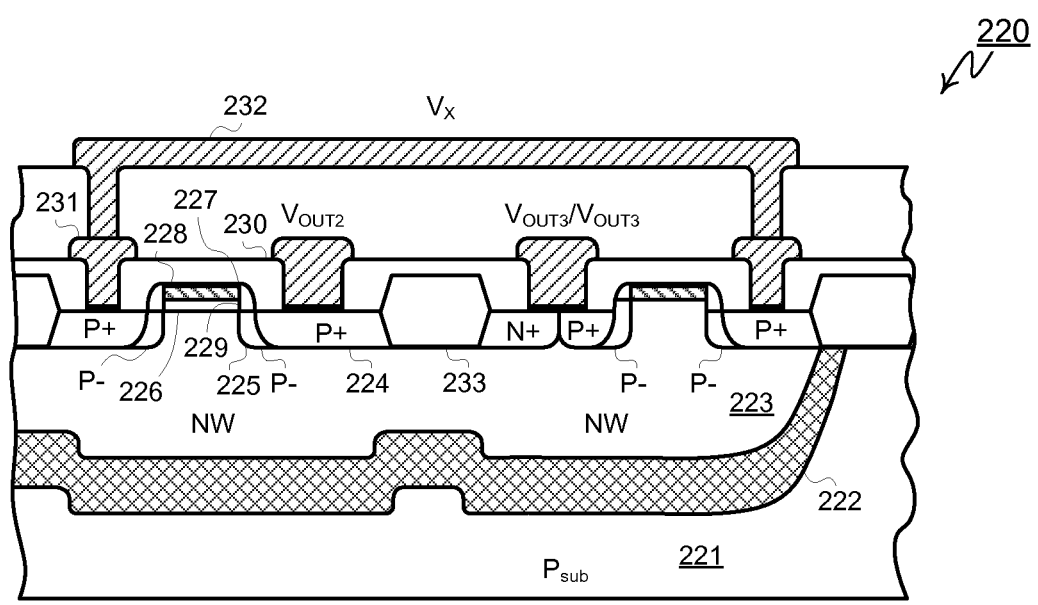
FIG. 10 illustrates an integrated circuit cross section showing one embodiment for monolithic integrating P-channel synchronous rectifiers.

Regardless of the circuit, the P-channel devices shown in schematics 180 and 200 can be integrated using standard CMOS or preferably realized in a process that provides a heavily doped high, i.e. high concentration, buried layers. One such implementation illustrated in cross section 220 of FIG. 10 utilizes a deep implanted N-type region 222 overlapping the bottom of N-type well 223. In the implementation shown well 223 and deep implant 222 are formed conformal to LOCOS oxide 233. The P-channel MOSFET includes P+ source drain regions 224, P-type lightly doped drain extension 225, sidewall spacer 229, polysilicon gate 228, gate silicide 227, contact barrier metal 235, $1^{st}$ layer metal 231 and second layer metal 232. This concept, referred to herein as a variable gate width switching converter, is described in prior art U.S. Pat. No. 5,973,367 by Richard K. Williams and in another implementation in U.S. Pat. No. 7,026,795 by John So.

Figure 8:
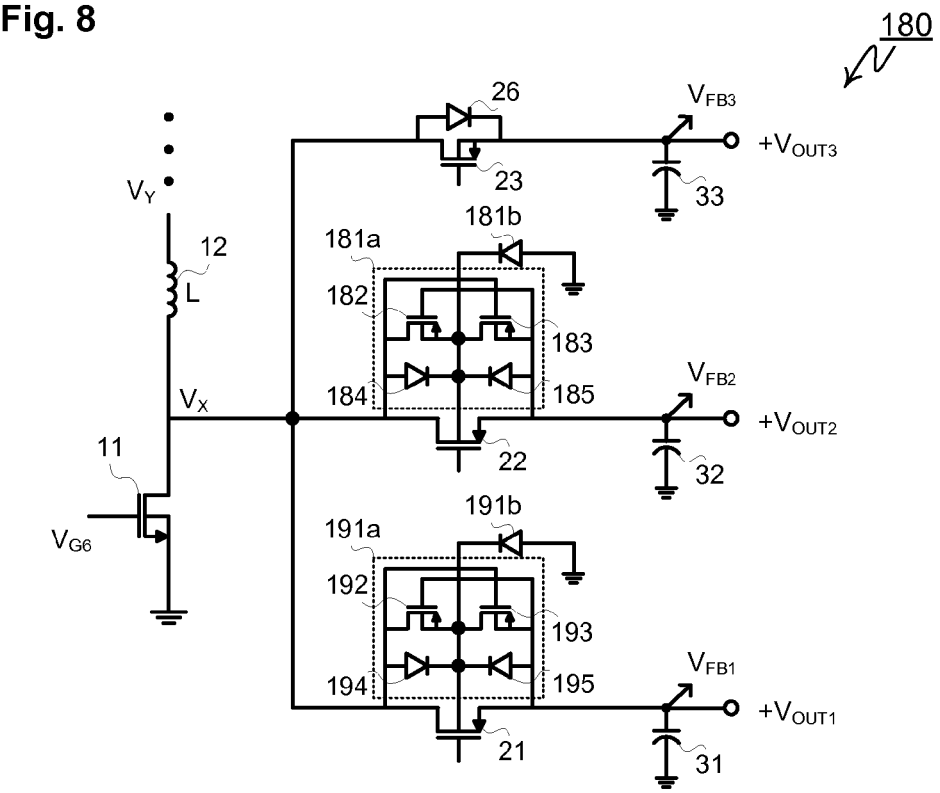
FIG. 8 illustrates one implementation of the boost converter of FIG. 2 using P-channel MOSFETs as synchronous rectifiers with adaptive body bias circuitry to supply the positive output nodes.

As an example, in cross section 220 the N-type well shared by MOSFETs 21, 22 and 23 are biased to the positive output potential $+V_{OUT3}$. P-channel 21, not shown in cross section 229 can also be integrated into the same shared well. If a BBG circuit such as shown in FIG. 8 is required, however MOSFETs 21, 22 and 23 must each employ their own separate wells and cannot share a common one.

Figure 11:
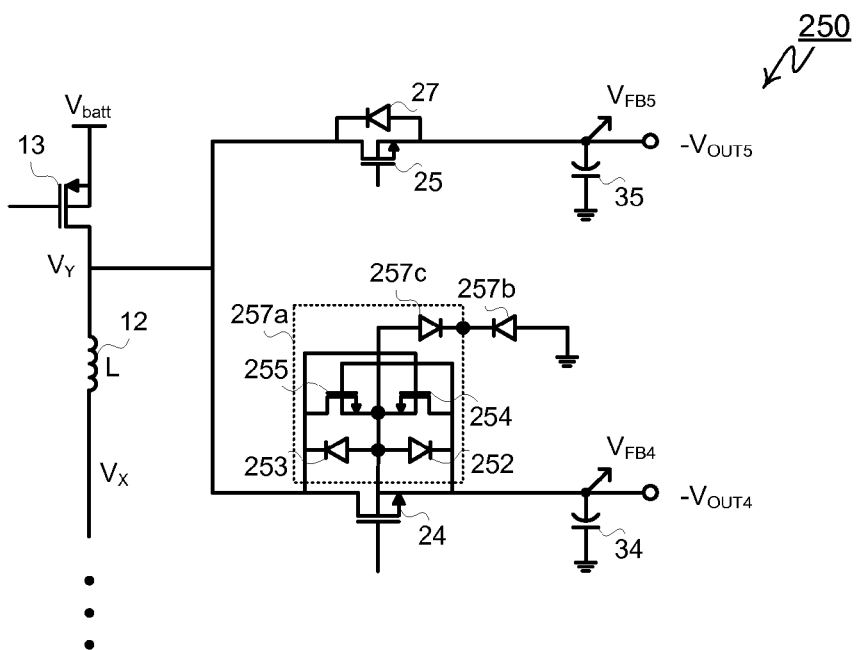
FIG. 11 illustrates one implementation of the boost converter of FIG. 2 using N-channel MOSFETs as synchronous rectifiers with adaptive body bias circuitry to supply the negative output nodes.

The same BBG circuit technique can be applied for N-channel MOSFETs used as synchronous rectifiers for the converter's negative outputs. As shown in circuit 250 of FIG. 11, MOSFET 24 includes cross coupled N-channel MOSFETs 254 and 255 to selectively shunt intrinsic diodes 253 and 252. Since the body of N-channel 24 is P-type it must be isolated from the P-type substrate in order to monolithically integrate circuit 250. Isolation of N-channel MOSFETs generally requires a special wafer fabrication process whereby a N-type isolation layer 257A surrounding and enclosing the MOSFET forms a reversed biased diode 257B with the surrounding P-type substrate and a reversed biased diode 257C with said enclosed P-type well. N-type isolation layer 257A is biased at voltage more positive than its operating voltages, e.g. to $+V_{batt}$ or $+V_{OUT3}$ to prevent forward biasing of the isolation region to its surroundings. Floating N-channel MOSFET 25 also requires isolation since it is not ground connected, even though it contains source to drain diode 27 and a source-body short.

Figure 12:
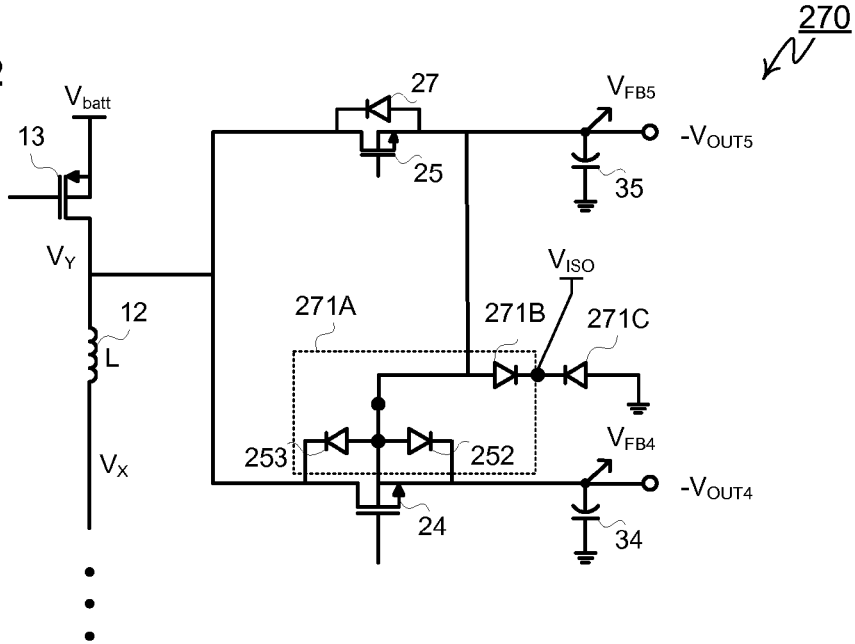
FIG. 12 illustrates an alternate implementation of the boost converter of FIG. 2 using N-channel MOSFETs as synchronous rectifiers to supply the negative outputs nodes without requiring adaptive body bias circuitry.
Figure 13:
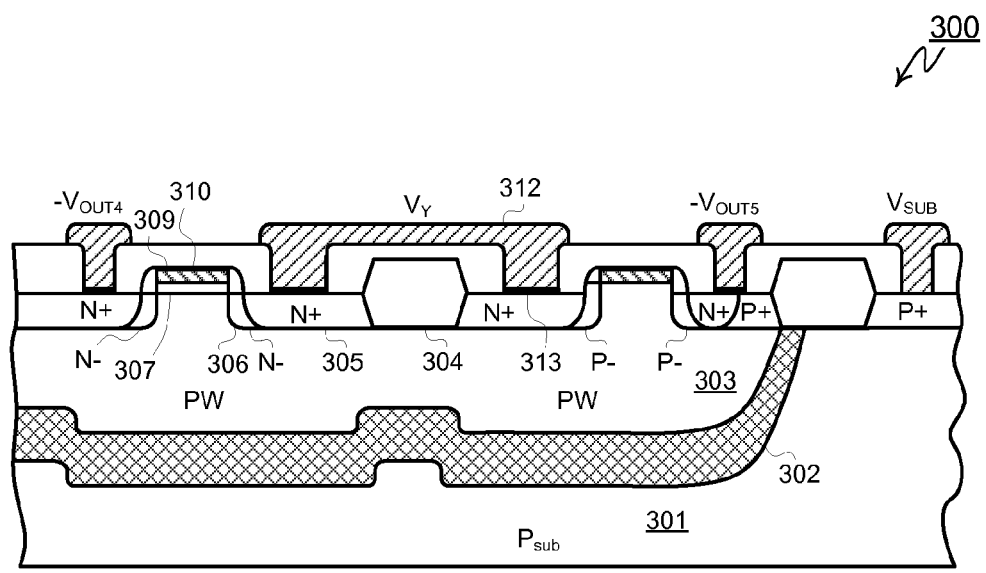
FIG. 13 illustrates an integrated circuit cross section showing one embodiment for monolithic integrating N-channel synchronous rectifiers.

An alternative approach shown in circuit 270 of FIG. 12, biases the P-type body of N-channel MOSFET 24 to the most negative circuit potential $-V_{OUT5}$. The floating device still requires isolation from the P-type substrate using a specialized process with isolated devices. Formed in a P-well surrounded by an N-type isolation layer 271A, the isolation is generally biased to a potential $V_{ISO}$ more positive than the operating voltage range of the device. Positive bias supplies may comprise the $V_{batt}$ input or a positive output such as $+V_{OUT3}$. Properly biased, N-type isolation layer 271A forms a reversed biased diode 271B with its surrounding P-type material and also forms a reverse biased diode 271C with the P-well it encloses.

One such implementation is shown in cross section 300 with a deep implanted N-isolation region 302 surrounding a P-type well 303 containing two N-channel MOSFETs for producing outputs $-V_{OUT4}$ and $-V_{OUT5}$. The isolation is independently biased to a potential equal to or more positive that $V_{batt}$. The N-channel MOSFET includes N+ source drain regions 305, N-type lightly doped drain extension 306, sidewall spacer, gate oxide 307, polysilicon gate 309, gate silicide 310, contact barrier metal 313, $1^{st}$ layer metal 312 and second layer metal (not shown). The process to fabricate such a device is also described in U.S. Pat. No. 6,855,985 "Modular Bipolar-CMOS-DMOS Analog Integrated Circuit & Power Transistor Technology" by Richard K. Williams et al. incorporated herein by reference.

What is claimed is:

1. A dual-polarity multi-output synchronous boost converter comprising:
   an inductor;
   first, second, third, fourth and fifth output nodes; and
   a switching network, the switching network being configured to provide a first mode of circuit operation in which a positive electrode of the inductor is connected to an input voltage and a negative electrode of the inductor is connected to ground, a second mode of circuit operation in which the negative electrode of the inductor is connected in sequence to each of the first, second and third output nodes and the positive electrode of the inductor is connected in sequence to each of the fourth and fifth output nodes, and a third mode of circuit operation in which the positive electrode of the inductor is connected to the input voltage and the negative electrode of the inductor is connected in sequence to each of the first, second and third output nodes.

2. The dual-polarity dual-output synchronous boost converter of claim 1 further comprising a control circuit that causes the first, second and third modes to be selected in a repeating sequence.

3. The dual-polarity dual-output synchronous boost converter of claim 2 wherein the repeating sequence has the form first mode, second mode, first mode, third mode.

4. The dual-polarity dual-output synchronous boost converter of claim 3 wherein the repeating sequence has the form first mode, second mode, third mode.

5. The dual-polarity dual-output synchronous boost converter of claim 1 further comprising a feedback circuit that modulates the duration of the respective connections between the inductor, the input voltage, ground and the output nodes to control the voltage of the output nodes.

6. The dual-polarity dual-output synchronous boost converter of claim 1 wherein the switching network is configured to provide a fourth mode in which the negative electrode of the inductor is connected in sequence to one or more of the first, second and third output nodes and the positive electrode of the inductor is connected in sequence to one or more of the fourth and fifth output nodes.

7. A dual-polarity multi-output synchronous boost converter comprising:
   an inductor;
   first, second, third, fourth and fifth output nodes; and
   a switching network, the switching network being configured to provide a first mode of circuit operation in which a positive electrode of the inductor is connected to an input voltage and a negative electrode of the inductor is connected to ground, a second mode of circuit operation in which the negative electrode of the inductor is connected to ground and the positive electrode of the inductor is connected in sequence to each of the fourth and fifth output nodes, and a third mode of circuit operation in which the positive electrode of the inductor is connected to the input voltage and the negative electrode of the inductor is connected in sequence to each of the first, second and third output nodes.

8. The dual-polarity dual-output synchronous boost converter of claim 7 further comprising a control circuit that causes the first, second and third modes to be selected in a repeating sequence.

9. The dual-polarity dual-output synchronous boost converter of claim 8 wherein the repeating sequence has the form first mode, second mode, first mode, third mode.

10. The dual-polarity dual-output synchronous boost converter of claim 8 wherein the repeating sequence has the form first mode, second mode, third mode.

11. The dual-polarity dual-output synchronous boost converter of claim 7 further comprising a feedback circuit that modulates the duration of the respective connections between the inductor, the input voltage, ground and the output nodes to control the voltage of the output nodes.

12. The dual-polarity dual-output synchronous boost converter of claim 7 wherein the switching network is configured to provide a fourth mode in which the negative electrode of the inductor is connected to ground and the positive electrode of the inductor is connected in sequence to one or more of the fourth and fifth output nodes.

13. A method for operating a dual-polarity multi-output synchronous boost converter which includes an inductor and first, second, third, fourth and fifth output nodes, the method comprising:
    configuring a switching network so that the boost converter operates in a first mode in which a positive electrode of the inductor is connected to an input voltage and a negative electrode of the inductor is connected to ground;
    configuring the switching network so that the boost converter operates in a second mode in which the negative electrode of the inductor is connected to ground and the positive electrode of the inductor is connected in sequence to each of the fourth and fifth output nodes; and
    configuring the switching network so that the boost converter operates in a third mode in which the positive electrode of the inductor is connected to the input voltage and the negative electrode of the inductor is connected in sequence to each of the first, second and third output nodes.

14. The method of claim 13 wherein the first, second and third modes are selected in a repeating sequence.

15. The method of claim 14 wherein the repeating sequence has the form first mode, second mode, first mode, third mode.

16. The method as recited in claim 14 wherein the repeating sequence has the form first mode, second mode, third mode.

17. The method of claim 13 further comprising configuring the switching network so that the boost converter operates in a fourth mode in which the negative electrode of the inductor is connected to ground and the positive electrode of the inductor is connected in sequence to one or more of the fourth and fifth output nodes.

18. The method of claim 17 further comprising modulating the duration of the respective connections between the inductor, the input voltage, ground and output nodes to control the voltage of the output nodes.

19. A dual-polarity multi-output synchronous boost converter comprising:
    an inductor;
    a high-side switch and low-side switch connected in a series conduction path, the inductor being connected in the series conduction path between the high-side switch and the low-side switch;
    a first node between the inductor and the low-side switch in the series conduction path, the first node being connected through a first positive-output synchronous rectifier switch to a first positive output terminal, through a second positive-output synchronous rectifier switch to a second positive output terminal, and through a third positive-output synchronous rectifier switch to a third positive output terminal, the first positive synchronous rectifier switch including a first MOSFET having a source-body short so as to create a first diode between a source and a drain of the first MOSFET;
    a second node between the inductor and the high-side switch in the series conduction path, the second node being connected through a first negative-output synchronous rectifier switch to a first negative output terminal, and through a second negative-output synchronous rectifier switch to a second negative output terminal, the first negative-output synchronous rectifier switch including a second MOSFET having a source-body short so as to create a second diode between a source and a drain of the second MOSFET; and
    a controller for controlling the on-time of the high-side and low-side switches being coupled to the high-side and low-side switches.

20. The dual-polarity multi-output synchronous boost converter of claim 19 wherein the second positive-output synchronous rectifier switch includes a third MOSFET, the third positive-output synchronous rectifier switch includes a fourth MOSFET, and the second negative-output synchronous rectifier switch includes a fifth MOSFET.

21. The dual-polarity multi-output synchronous boost converter of claim 20 wherein none of the third, fourth and fifth MOSFETs includes a source-body short.

22. The dual-polarity multi-output synchronous boost converter of claim 20 wherein each of the third, fourth and fifth MOSFETS is connected to a respective body bias generator circuit, each body bias generator functioning to prevent any intrinsic diode in the MOSFET to which said body bias generator is connected from becoming forward-biased.

23. The dual-polarity multi-output synchronous boost converter of claim 20 wherein a body of each of the third and fourth MOSFETs is respectively connected to the first positive output terminal.

24. The dual-polarity multi-output synchronous boost converter of claim 20 wherein a body of the fifth MOSFET is connected to the second negative output terminal.

25. The dual-polarity multi-output synchronous boost converter of claim 19 wherein each of the first, second, and third positive output terminals and each of the first and second negative output terminals are connected to the controller via respective feedback paths.

26. The dual-polarity multi-output synchronous boost converter of claim 19 comprising only one single inductor.

* * * * *

UNITED STATES PATENT AND TRADEMARK OFFICE
CERTIFICATE OF CORRECTION

Page 1 of 1

| | |
|---|---|
| PATENT NO. | : 8,823,342 B2 |
| APPLICATION NO. | : 12/168626 |
| DATED | : September 2, 2014 |
| INVENTOR(S) | : Williams |

Figure 1:
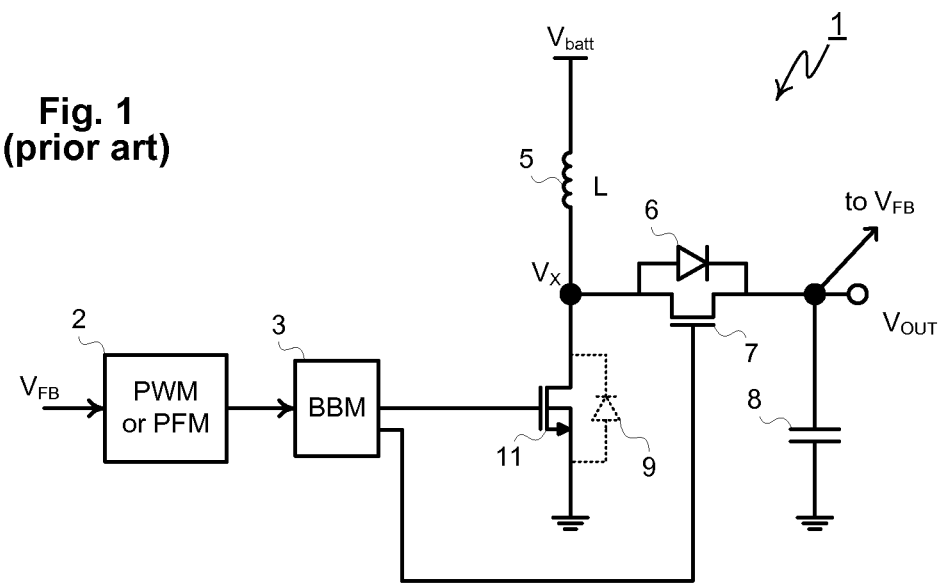
FIG. 1 is a schematic of a prior art single output synchronous boost converter.

It is certified that error appears in the above-identified patent and that said Letters Patent is hereby corrected as shown below:

In the Drawings:

In Fig. 1, delete reference numeral "11" and insert -- 4 --.

In the Specification:

Column 1, Line 37, delete "and inductor" and insert -- an inductor --.

Column 2, Line 33, insert -- diode -- after the word "Schottky".

Column 2, Line 35, delete "includes" and insert -- include --.

Column 3, Line 21, delete "11" and insert -- 4 --.

Column 3, Line 42, delete "7" and insert -- 9 --.

Column 3, Line 47, delete "3" and insert -- 5 --.

In the Claims:

Column 19, Line 53, delete "and output" and insert -- and the output --.

Signed and Sealed this
Twenty-sixth Day of January, 2016

Michelle K. Lee
*Director of the United States Patent and Trademark Office*